(12) United States Patent  
Azumai

(10) Patent No.: US 8,958,133 B2  
(45) Date of Patent: Feb. 17, 2015

(54) SIGNAL PROCESSING APPARATUS AND IMAGE FORMING APPARATUS

(71) Applicant: Konica Minolta, Inc., Chiyoda-ku, Tokyo (JP)

(72) Inventor: Mitsuo Azumai, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/084,357

(22) Filed: Nov. 19, 2013

(65) Prior Publication Data

US 2014/0153063 A1    Jun. 5, 2014

(30) Foreign Application Priority Data

Nov. 30, 2012  (JP) ................................. 2012-262445

(51) Int. Cl.  
*H04N 1/40*  (2006.01)

(52) U.S. Cl.  
CPC ....................................... *H04N 1/40* (2013.01)  
USPC ............ 358/474; 358/1.15; 382/305; 399/72; 348/471

(58) Field of Classification Search  
CPC ............ G03G 15/5062; G03G 15/011; G03G 15/0189; G03G 15/04072; G03G 2215/00067; G03G 2215/0119; G03G 15/5041; G03G 2215/00042; G03G 2215/00561  
USPC ........... 348/371, E5.022, E5.091, 148, 222.1, 348/240.99, 296, 302, 333.02; 358/1.14, 358/1.15, 1.2, 1.6, 504; 382/154, 201, 291, 382/305; 399/15, 49, 72; 347/131, 132, 347/140, 19, 224, 232, 235, 237, 250  
See application file for complete search history.

(56) References Cited

U.S. PATENT DOCUMENTS

| | | | |
|---|---|---|---|
| 5,086,261 A * | 2/1992 | Sakata et al. ................... | 318/268 |
| 5,351,107 A * | 9/1994 | Nakane et al. ................... | 399/49 |
| 6,051,585 A * | 4/2000 | Weinstein et al. ............. | 514/335 |
| 6,674,546 B1 * | 1/2004 | Nakahara ....................... | 358/1.9 |
| 6,753,984 B1 * | 6/2004 | Wada ............................. | 358/475 |
| 6,791,721 B1 * | 9/2004 | Konogaya et al. ............. | 358/474 |
| 6,832,008 B1 * | 12/2004 | Wada ............................. | 382/275 |
| 7,006,705 B2 * | 2/2006 | Takayama et al. ............. | 382/275 |
| 7,088,477 B2 * | 8/2006 | Koshimizu et al. ........... | 358/487 |
| 7,503,634 B2 * | 3/2009 | Takahashi et al. ............. | 347/15 |
| 7,652,793 B2 * | 1/2010 | Yamazaki ..................... | 358/3.09 |
| 8,035,069 B2 * | 10/2011 | Toda et al. .................. | 250/208.1 |
| 8,077,955 B2 * | 12/2011 | Dannels et al. ............... | 382/131 |
| 2011/0285804 A1 * | 11/2011 | Esumi ........................... | 347/224 |

FOREIGN PATENT DOCUMENTS

| | | |
|---|---|---|
| JP | 8-156330 A | 6/1996 |
| JP | 11-196273 A | 7/1999 |
| JP | 2002-244407 A | 8/2002 |

* cited by examiner

*Primary Examiner* — Negussie Worku  
(74) *Attorney, Agent, or Firm* — Holtz, Holtz, Goodman & Chick PC

(57) ABSTRACT

A signal processing apparatus includes a pulse signal producing section configured to produce image creating signals for image formation in response to image data by using an image processing clock corresponding to each pixel of the image data; a measuring section configured to measure a difference between an actual value and an ideal value of a signal width of the image creating signal at the time of measurement; and a processing section configured to correct the image data so as to cancel the difference at the time of an actual action.

16 Claims, 7 Drawing Sheets

SIGNAL PROCESSING APPARATUS AND IMAGE FORMING APPARATUS

BACKGROUND OF THE INVENTION

1. Field of the Invention

In a signal processing apparatus configured to perform signal processing based on image data and an image forming apparatus, the present invention relates to a technique to cancel a difference of the actual value and the ideal value of an image creating signal.

2. Description of Related Art

In an apparatus well known as an image forming apparatus, image creating signals are produced in accordance with image data, images are formed on one line or several lines in the main scanning direction based on the image creating signals, and the image formation on each line in the main scanning direction is repeated in the subsidiary scanning direction, whereby image formation for one page is performed.

In an electro-photographing type image forming apparatuses being one example of the above apparatus, image creating signals are produced from image data. PWM signals produced by a PWM circuit correspond to such image creating signals. In such an image forming apparatus, a laser beam modulated based on the PWM signals is made to scan in a main scanning direction, and in parallel to the scanning in the main scanning direction, an image carrying member is rotated in the subsidiary scanning direction. Accordingly, on the image carrying member, a two dimensional image is formed by the laser beam.

Incidentally, due to environmental factors, such as a temperature change, and various factors such as individual differences of circuit elements, image creating signals, such as PWM signals cause fluctuation in signal width. That is, the measured actual signal width (actual value) of an image creating signal may become a different value from a signal width (ideal value) which is originally planned. The fluctuation of the actual value of the image creating signal causes density level changes on images formed by the image forming apparatus.

In the image forming apparatus, the positioning of image formation in the main scanning direction in response to image data is made on the basis of clocks which are used as a standard of pixels to be formed and called "image processing clock" or "dot clock".

Techniques with regard to correction of such a density level change in the image forming apparatus are disclosed in Patent Documents, such as Japan Unexamined Patent Publication Nos. 2002-244407, 11-196273, and 8-156330.

SUMMARY OF THE INVENTION

The technique disclosed in Japan Unexamined Patent Publication No. 2002-244407 enables to provide an image forming apparatus which can reduce influences to a high voltage output value due to variations of the voltage of a power source and obtain a good image creating condition. However, when the actual value of an image creating signal becomes different from a theoretical value, a countermeasure to suppress the influences is not suggested.

The technique disclosed in Japan Unexamined Patent Publication No. 11-196273 suggests executing density level correction so as to reduce the gradation characteristics of images due to changes in the sensitivity characteristic and charging performance of an image carrying member, such as a photo conductor drum. However, when the actual value of an image creating signal becomes different from a theoretical value, a countermeasure to suppress the influences is not suggested.

The technique disclosed in Japan Unexamined Patent Publication No. 8-156330 suggests an image forming apparatus which includes a plurality of gradation expressing devices and can perform image formation in a good manner for any one of a photographic image and a character image. However, when the actual value of an image creating signal becomes different from a theoretical value, a countermeasure to suppress the influences is not suggested.

Further, according to generally-practiced techniques, a patch image with prescribed density levels is formed on a photo conductor or a paper sheet, the patch image is read out with a sensor, and gamma correction is performed based on the read-out results. However, for a trend to shift to a high image resolution and a low gradation in an image forming apparatus, for example, for the shift from an image resolution of 4800 dpi and a gradation of 8 bits to an image resolution of 600 dpi and a gradation of one bit, it becomes difficult for the conventional simple gamma correction to deal with.

Furthermore, it may be considered that with regard to errors in the image creating signal, the image creating signal itself is to be handled individually without performing comprehensive correction, such as gamma correction based on the above density patch. However, when the actual value of the image creating signal, such as the PWM signal becomes different from an expected theoretical value due to various factors, there may be a case where a circuit to produce the image creating signal has a certain cause.

In such a case, even if a feed-back circuit to perform correction is simply added to the circuit to produce the image creating signal, it may considered that it is difficult to cancel a difference correctly. Moreover, in such a case, when a PWM signal is produced, it is difficult to cancel a difference accurately by correcting its pulse width finely in a PWM circuit.

The present invention has been achieved in order to solve the above problems, and an object of the present invention is to realize a signal processing apparatus which can cancel a difference between the actual value and the ideal value of an image creating signal and an image forming apparatus.

In order to realize at least one of the above-mentioned objects, a signal processing apparatus reflecting one aspect of the present invention includes:

a pulse signal producing section configured to produce image creating signals for image formation in response to image data by using an image processing clock corresponding to each pixel of the image data;

a measuring section configured to measure a difference between an actual value and an ideal value of a signal width of the image creating signal at the time of measurement; and a processing section configured to correct the image data so as to cancel the difference at the time of an actual action.

Further, in order to realize at least one of the above-mentioned objects, an image forming apparatus reflecting one aspect of the present invention includes:

a signal processing apparatus configured to produce image creating signals for image formation in response to image data by using an image processing clock pulse corresponding to each pixel of the image data; and an image forming section configured to form images based on the image creating signal produced by the signal processing apparatus, wherein the signal processing apparatus further includes:

a pulse signal producing section configured to produce image creating signals for image formation in response to image data by using an image processing clock corresponding to each pixel of the image data;

a measuring section configured to measure a difference between an actual value and an ideal value of a signal width of the image creating signal at the time of measurement; and a processing section configured to correct the image data so as to cancel the difference at the time of an actual action.

Herein, it is preferable that the processing section corrects either a target pixel or a peripheral pixel around the target pixel so as to cancel the difference of the target pixel measured at the time of the measurement.

Further, herein, it is preferable that when the image data are binary image data including an ON state and an OFF state, the processing section corrects an ON state to an OFF state, or an OFF state to an ON state with a ratio of one pixel for multiple pixels of the image data.

Further, herein, it is preferable that when the processing section performs image processing so as to express gradation with multiple pixels serving as an expression unit, the processing section performs correction so as to cancel the difference before the image processing.

Further, herein, it is preferable that the measuring section prepares measurement clocks asynchronous with the image processing clocks, compares the measurement clocks with the signal width of the image creating signal corresponding to the predetermined image data for a prescribed time period, and measures the difference from a ratio of conformity to non-conformity in the comparison.

DETAILED DESCRIPTION OF THE INVENTION

Hereafter, with reference to drawings, description will be given in detail to a configuration (embodiment) for implementing a signal processing apparatus and an image forming apparatus according to the present invention.

[First Constitution of the Signal Processing Apparatus and the Image Forming Apparatus]

Here, based on FIG. 1, the constitution of a signal processing apparatus 100 usable for image formation will be described in detail. However, description is omitted to general portions which are well known as the signal processing apparatus 100 and have nothing directly to do with the featured actions and control of this embodiment. Further, as specific embodiments, description will be given to a signal processing apparatus and an image forming apparatus which create images from binary outputs by using binary image data which include an ON state and an OFF state, and form images.

Figure 1:
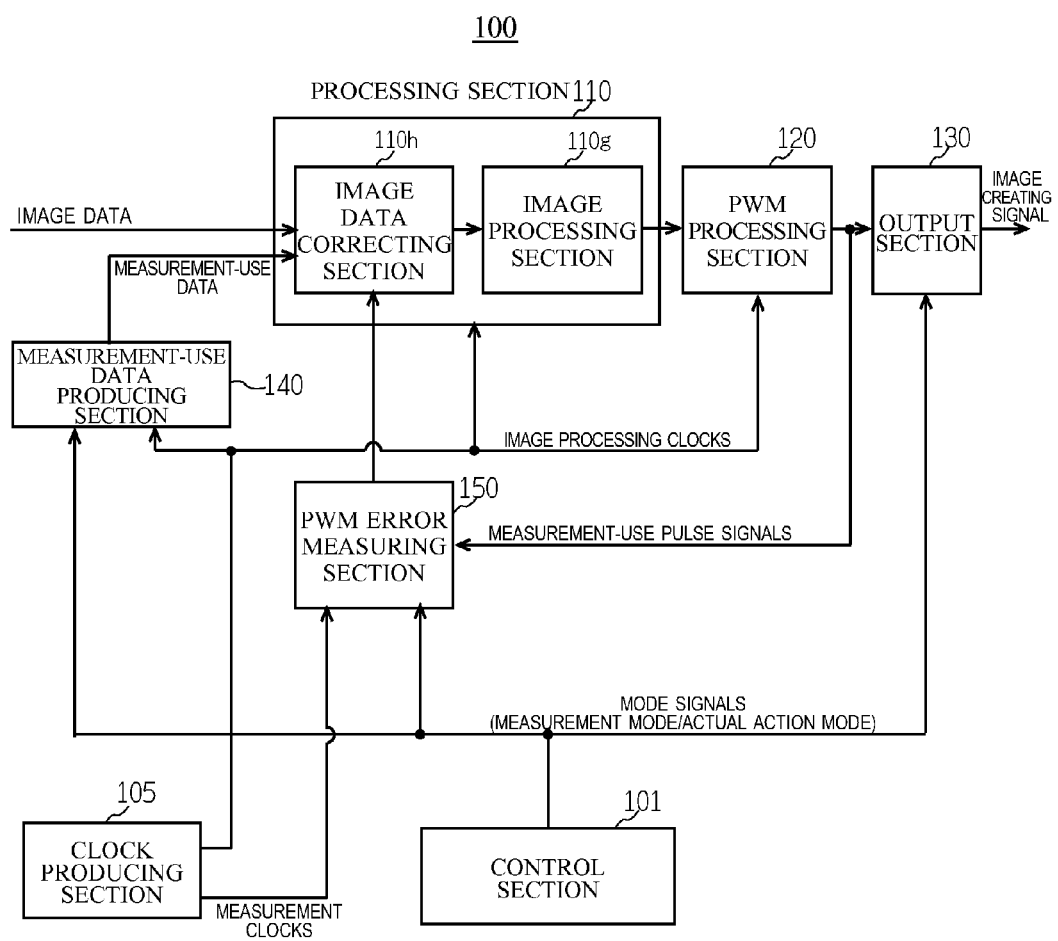
FIG. 1 is a constitutional diagram showing a constitution of a signal processing apparatus of an embodiment of the present invention.

The signal processing apparatus 100 shown in FIG. 1 is constituted so as to include a control section 101 which controls each section; a clock producing section 105 which produces image processing clocks and measurement clocks; a processing section 110 which applies various kinds of processing to image data; a PWM processing section 120 which produces a pulse signal for each pixel serving as a production unit in response to image data or data used for measurement; an output section 130 which switches whether to output or to stop outputting pulse signals based on a mode signal output from the control section 101; a measurement-use data producing section 140 which produces data used for measurement (hereafter, referred to "measurement-use data") at the time of measurement; and a PWM error measuring section 150 which measures a difference between an actual value and an ideal value of a pulse signal corresponding to the measurement-use data at the time of measurement. Here, the actual value means the value of the signal width of a pulse signal obtained by measurement. Further, in this embodiment, the ideal value means the value of the signal width of a pulse signal which is originally intended or expected. Further, in the image forming apparatus having the signal processing apparatus 100, the outputting pulse signals from the signal processing apparatus 100 in response to image data are supplied to the image forming section as image creating signals. Here, the image forming section includes an exposure section, a developing section, a transfer section, a fixing section and so on. Further, the image forming section forms images on one line or several lines in the main scanning direction based on the image creating signals and repeats the image formation on each line in the main scanning direction is repeated in the subsidiary scanning direction, whereby image formation for one page is performed.

The processing section 110 is constituted so as to include an image data correcting section 110h which corrects image data and an image processing section 110g which performs image processing to express gradation for multiple pixels serving as an expression unit by screen processing and error diffusion processing.

Here, the control section 101 is configured to control each section of the signal processing apparatus 100 and, in addition, to produce mode signals of a measurement mode at the time of measurement and to produce mode signals of an actual action mode at the time of an actual action to actually form an image. These mode signals include at least information to discriminate the time of measurement and the time of an actual action. Further, at the time of measurement, the mode signal may include information of two or more measurement modes. Furthermore, this control section 101 may be used exclusively as the control section of the signal processing apparatus 100, or may be also used additionally as the control section of the image forming apparatus.

The clock producing section 105 is configured to produce image processing clocks in which one clock pulse corresponds to each pixel of image data, and measurement clocks which are used for measurement and are asynchronous with the image processing clocks. Here, when the frequency of the image processing clocks is f1 [Hz], the frequency f2 [Hz] of the measurement clocks is set to have a relationship of 0.5f1<f2<f1.

Here, the term "asynchronous" means that the frequency of the image processing clocks and the frequency of the measurement clocks have not a relationship of an integer ratio. Further, the term "asynchronous" means more preferably that the frequency of the image processing clocks and the frequency of the measurement clocks have not a relationship of an integer ratio, and in addition, the respective phases of standing-up and falling-down of an image processing clock are made not to conform to those of a measurement clock as far as possible.

[First Action of the Signal Processing Apparatus and the Image Forming Apparatus]

With reference to a flowchart of FIG. 2 and explanatory drawings of FIGS. 3 to 10, the actions of the signal processing apparatus 100 and the actions of the image forming apparatus equipped with this signal processing apparatus 100 will be described hereafter. Here, examples of the actions include measurement and actual actions as broadly-separated categories.

[Measurement Action]

Figure 2:
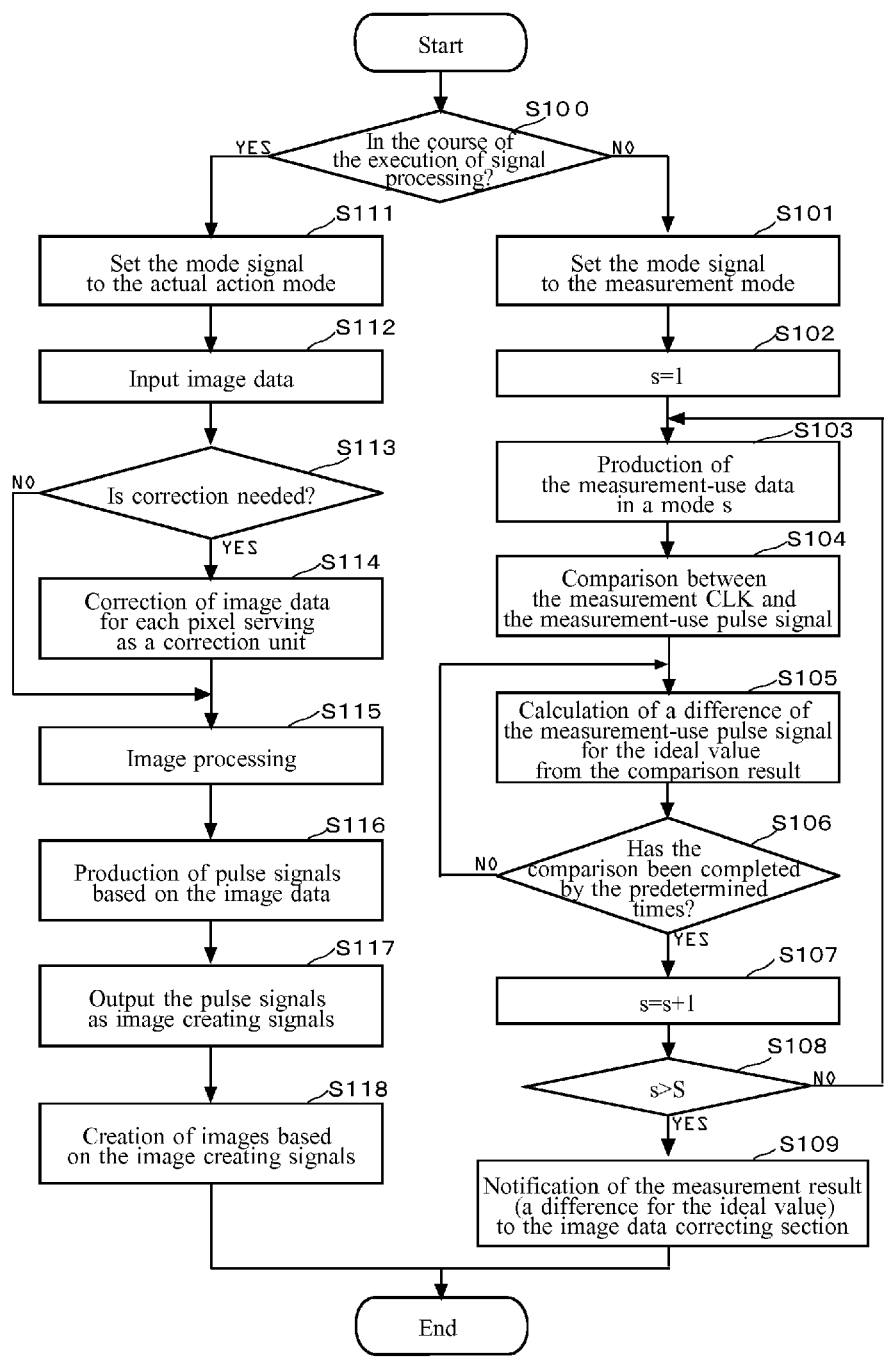
FIG. 2 is a flowchart for explaining actions in the embodiment of the present invention.

The control section 101 checks whether the signal processing apparatus 100 is in the course of the execution of signal processing to create images for image formation (Step S100 in FIG. 2). When the signal processing apparatus 100 is not in the course of the execution of the signal processing to create images for image formation ("No" at Step S100 in FIG. 2), in order to measure a difference between an actual value and an ideal value of a pulse signal by the PWM error measuring section 150, the mode signal is set to a measurement mode (Step S101 in FIG. 2).

Here, a whole period being not in the course of the execution of the signal processing to create images for image formation is not needed to be made to the measurement mode. That is, the control section 101 may control the action to progress to the measurement mode in the case of being not in the course of the execution of the signal processing to create images for image formation and in the case where a prescribed time period has elapsed after the previous measurement. Further, even in a period when the image forming apparatus executes image formation, the timing between signal processing to create images for a certain paper sheet and signal processing to create images for the next paper sheet may be set to a measurement mode.

When the mode signal becomes a measurement mode, the measurement-use data producing section 140 sets "s" which means a measurement mode "s" to 1 (Step S102 in FIG. 2), produces measurement-use data for the measurement mode "s" (measurement mode "1"), and supplies the measurement-use data to the PWM processing section 120 via the processing section 110. With this, the PWM processing section 120 produces measurement-use pulse signals in response to the measurement-use data (Step S103 in FIG. 2).

FIG. 3(a) shows an example of the measurement-use data in the mode 1. Here, the measurement-use data are shown in such a way that the data composed of four pixels serving as a data unit is repeated, and that the first pixel, the third pixel, and the fourth pixel are made in an OFF state and the second pixel is made in an ON state. In FIG. 3(a), the OFF state is indicated with no shading, and the ON state is indicated with shading.

FIG. 3(b) shows measurement-use pulse signals produced by the PWM processing section 120 based on the measurement-use data in this mode 1. Here, in the measurement-use pulse signals shown in FIG. 3(b), the OFF state is set to a low level pulse, and the ON state is set to a high level pulse.

FIG. 4(a) shows an example of the measurement-use data in the mode 2 mentioned later. Here, the measurement-use data are shown in such a way that the data composed of four pixels serving as a data unit is repeated, and that the first pixel and the fourth pixel are made in an OFF state and the second pixel and the third pixel are made in an ON state. FIG. 4(b) shows measurement-use pulse signals produced by the PWM processing section 120 based on the measurement-use data in this mode 2

Figure 3:
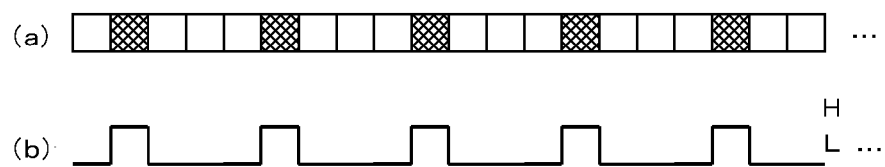
FIG. 3 is an explanatory drawing showing the situation of signal processing of an image forming apparatus.
Figure 4:
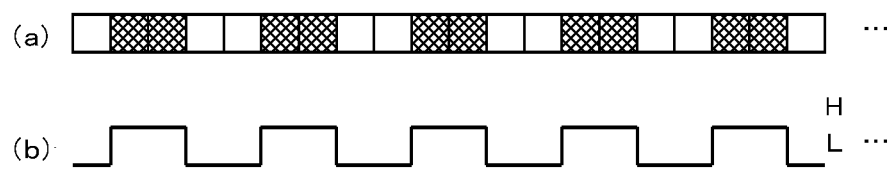
FIG. 4 is an explanatory drawing showing the situation of signal processing of an image forming apparatus.

Each of FIG. 3 and FIG. 4 shows a simple example of measurement-use data. However, actually, with data composed of further many pixels serving as a data unit, the measurement mode s can be made into a number of modes.

Subsequently, since the mode signal is a measurement mode, the measurement-use pulse signals from the PWM processing section 120 are not output to the outside, and the measurement-use pulse signals are supplied to the PWM error measuring section 150.

Here, into the PWM error measuring section 150, the above-mentioned measurement-use pulse signals and measurement clocks are input, and the measurement-use pulse signals and the measurement clocks are compared to each other by predetermined times (Step S104 in FIG. 2).

Incidentally, the clock producing section 105 produces the measurement clocks asynchronous with the image processing clocks. The term "asynchronous" means that the frequency of image processing clocks and the frequency of measurement clocks are not in a relationship of an integer ratio. For example, the frequency of the image processing clocks is set to 800 MHz, and the frequency of the measurement clocks is set to 571 MHz.

Here, at a timing of any one of standing-up and falling-down of a measurement clock, sampling to check whether a measurement-use pulse signal is in a high state or in a low state is executed repeatedly by the predetermined number of times, for example, by 1000 times. With this, even if the measurement clocks have a frequency lower than the image processing clocks, since the measurement clocks are asynchronous with the image processing clocks, the sampling of phase can be performed randomly, and increasing the number of times of the sampling can make an error smaller.

Here, in the measurement clocks with a frequency of 571 MHz, the period of on pulse is 1.75 nanoseconds. Accordingly, even if the measurement is repeated for 1000 pulses, it takes 1.75 milliseconds. Further, even if this measurement is repeated as a mode "s" by multiple modes, it does not take a significant time.

Here, if the measurement-use pulse signals shown in FIG. 3 has the ideal value, when the prescribed number of times is set to 1000 times, the high level is counted by 250 times being one fourth of 1000 times. However, in the comparison of 1000 times, if the PWM error measuring section 150 detects the high level by 275 times, calculation is made to 275 (detection value)/250 (ideal value)=1.10, and it is detected that the measurement-use pulse signals is longer by 10% (Step S105 to S106 in FIG. 2).

The above measurement by the use of the measurement-use pulse signals is repeated by incrementing "s" (Step S107 in FIG. 2) and by using different measurement-use pulse signals until "s" reaches a predetermined "S" (Step S103 to S108 in FIG. 2). For example, the measurement is repeated in such a way that the measurement is performed by the use of the measurement-use pulse signals (FIG. 3(b)) in the mode 1, and then performed by the use of the measurement-use pulse signals (FIG. 4(b)) in the mode 2.

In the above ways, the production of the measurement-use data by the measurement-use data producing section 140, the production of the measurement-use pulse signals by the PWM processing section 120 based on the measurement-use data, and the measurement of a difference between an actual value and an ideal value of a measurement-use pulse signal through the comparison between a measurement-use pulse signal and a measurement-use clock by the PWM error measuring section 150 are executed. Successively, the PWM error measuring section 150 notifies a measurement result to the image data correcting section 110h (Step S109 in FIG. 2). Here, at this time, the control section 101 cancels the measurement mode.

[Actual Actions]

The control section 101 checks whether the signal processing apparatus 100 is in the course of the execution of signal processing to create images for image formation (Step S100 in FIG. 2). When the signal processing apparatus 100 is in the course of the signal processing to create images for image formation ("Yes" at Step S100 in FIG. 2), the mode signal is set to an actual action mode (Step S111 in FIG. 2).

When image data are input (Step S112 in FIG. 2), a measurement result (a difference between the actual value and the ideal value of a pulse signal) is notified from the PWM error measuring section 150, and when correction is needed ("YES" at Step S113 in FIG. 2), the image data correcting section 110h corrects the image data for each pixel serving a correction unit (Step S114 in FIG. 2).

Here, if the difference between the actual value and the ideal value of the pulse signal is +X %, the correction is performed so as to decrease one pixel for every (1/(X/100)) pixels, thereby cancelling the difference. Further, if the difference between the actual value and the ideal value of the pulse signal is −X %, the correction is performed so as to increase one pixel for every (1/(X/100)) pixels, thereby cancelling the difference. Here, the difference between the actual value and the ideal value represents how much difference the actual value has with respect to the ideal value based on the ideal value as a reference (100%).

In concrete terms, for example, if the difference between the actual value and the ideal value of the pulse signal is +25%, the correction is performed so as to decrease one pixel for every (1/(25/100))=4 pixels, thereby cancelling the difference. Similarly, if the difference between the actual value and the ideal value of the pulse signal is +33%, the correction is performed so as to decrease one pixel for every (1/(33/100))=3 pixels, thereby cancelling the difference.

Further, if the difference between the actual value and the ideal value of the pulse signal is −25%, the correction is performed so as to increase one pixel for every (1/(25/100))=4 pixels, thereby cancelling the difference. Similarly, if the difference between the actual value and the ideal value of the pulse signal is −33%, the correction is performed so as to increase one pixel for every (1/(33/100))=3 pixels, thereby cancelling the difference.

After such a correction process to increase or decrease a pixel in the image data correcting section 110h, image processing is performed for every multiple pixels being a processing unit in terms of gradation expression by screen processing and error diffusion processing in the image processing sections 110g (Step S115 in FIG. 2). Here, since the gradation expression for every multiple pixels serving a processing unit by screen processing and error diffusion processing is a well-known technique in the field of image formation and printing, detailed description is omitted.

Further, upon receipt of the image data having been subjected to the image processing in the image processing section 110g, the PWM processing section 120 produces pulse signals by the PWM processing (Step S116 in FIG. 2).

Successively, since the mode signal is an actual action mode, the pulse signals from the PWM processing section 120 are supplied as image creating signals to the exposure section (not shown) of the image forming apparatus (Step S117 in FIG. 2). The image forming apparatus creates images based on the image creating signals such that toner images are formed on an image carrying member and the toner images are transferred to a recording paper sheet and fixed onto it (Step S118 in FIG. 2).

The above actions have been configured to measure a difference between the actual value and the ideal value of the pulse signal of the image creating signals at the time of measurement and to correct image data so as to cancel the difference at the time of the actual action. Accordingly, since a difference between the actual value and the ideal value of the pulse signal of the image creating signals is corrected digitally at the stage of image data, it becomes possible to cancel accurately a difference between the actual value and the ideal value of the pulse signal of the image creating signals.

Figure 5:
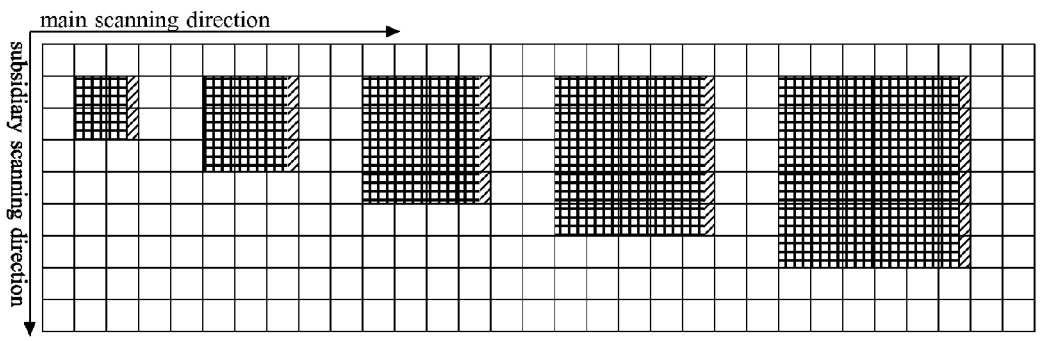
FIG. 5 is an explanatory drawing showing the situation of signal processing of an image forming apparatus.

FIG. 5 shows schematically a state of PWM signals, and a portion of a crosshatching pattern indicates that a PWM signal is in an ON state. On the other hand, a portion of an oblique hatching pattern indicates that since a PWM signal is shorter than a ideal value, the PWM signal do not become an ON state.

FIG. 5 shows the following cases in the order from the left. In the first case, an operation to form two pixels in an ON state in the main scanning direction is repeated two times in the subsidiary scanning direction, and when a pixel becomes from the ON state to the OFF state, the ON state is shorter by 33% of one pixel than the ideal value. In the second case, an operation to form three pixels in an ON state in the main scanning direction is repeated three times in the subsidiary scanning direction, and when a pixel becomes from the ON state to the OFF state, the ON state is shorter by 33% of one pixel than the ideal value. In the third case, an operation to form four pixels in an ON state in the main scanning direction is repeated four times in the subsidiary scanning direction, and when a pixel becomes from the ON state to the OFF state, the ON state is shorter by 33% of one pixel than the ideal value. In the fourth case, an operation to form five pixels in an ON state in the main scanning direction is repeated five times in the subsidiary scanning direction, and when a pixel becomes from the ON state to the OFF state, the ON state is shorter by 33% of one pixel than the ideal value. Further, in the fifth case, an operation to form six pixels in an ON state in the main scanning direction is repeated six times in the subsidiary scanning direction, and when a pixel becomes from the ON state to the OFF state, the ON state is shorter by 33% of one pixel than the ideal value.

Figure 6:
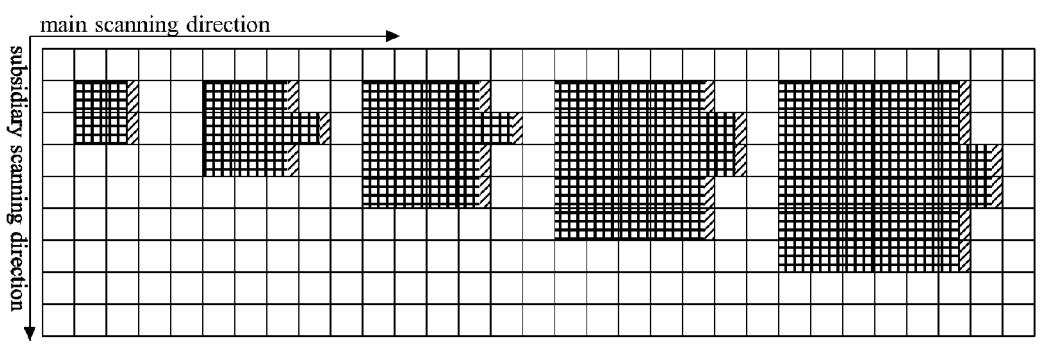
FIG. 6 is an explanatory drawing showing the situation of signal processing of an image forming apparatus.

FIG. 6 shows schematically a state of PWM signals after the correction, and a portion of a crosshatching pattern indicates that a PWM signal is in an ON state and a portion of an oblique hatching pattern indicates that since a PWM signal is shorter than the ideal value, the PWM signal do not become an ON state.

In this FIG. 6, since a PWM signal has a difference shorter by 33%, the correction is performed so as to increase a pixel in a ratio of one pixel per three pixels. In the order from the left, in the first case, since the number of pixel having a difference is two, the correction is not performed. In the second case, since the number of pixel having a difference is three, the correction is performed so as to increase one pixel. In the third case, since the number of pixel having a difference is four, the correction is performed so as to increase one pixel. In the fourth case, since the number of pixel having a difference is five (near to six), the correction is performed so as to increase two pixels. In the fifth case, since the number of pixel having a difference is six, the correction is performed so as to increase two pixels.

Here, in FIG. 6, since the increased pixels are added at portions far from the corner of the end portion of a group of multiple pixels, a shape change as an image is small. Accordingly, a sense of discomfort as an image is also small.

Figure 7:
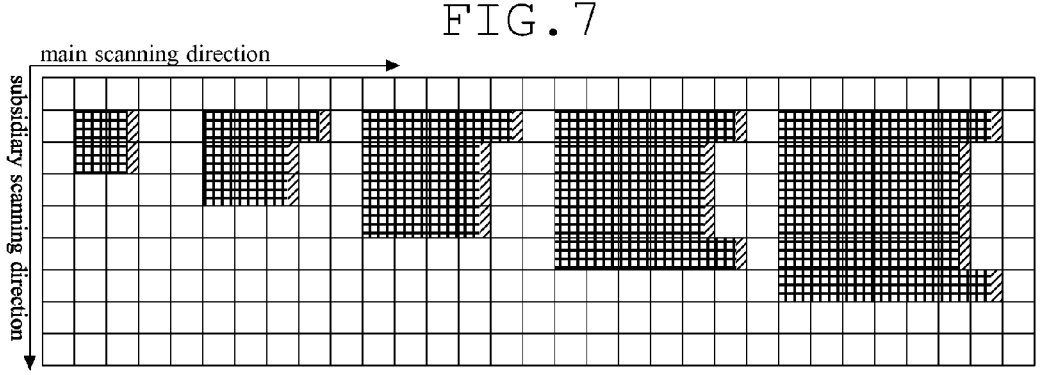
FIG. 7 is an explanatory drawing showing the situation of signal processing of an image forming apparatus.

Further, in FIG. 7, although the increased pixels are added similarly to FIG. 6, the increased pixels are added at portions near to the corner of the end portion of a group of multiple pixels. For this reason, a shape change as an image is large. Accordingly, a sense of discomfort as an image becomes relatively large. Therefore, the example in FIG. 7 is an undesirable example. However, although the examples in FIG. 6 and FIG. 7 are the general examples, they are not absolute examples applicable to all the cases.

For example, in this example, although pixels are added at the positions (target pixels) having a difference in pulse width, the pixels may be added at the other positions (periphery pixels) in the group of pixels. Further, it is preferable that pixels are added with reference to a preliminarily-prepared table.

For example, it is also preferable to prepare preliminarily tables of suitable patterns for each of photographic image and character. At this time, correction for the addition is performed so as to make the added pixels not to protrude from a group of original pixels, that is, not to isolate, whereby it becomes possible to cancel a difference between the actual value and the ideal value of an image creating signal correctly and suitably.

Further, with the execution of the addition of pixels at the previous stage of the screen processing and the error diffusion processing, it becomes possible to cancel a difference between the actual value and the ideal value of an image creating signal correctly and suitably without disturbing the pattern of gradation expression in the image processing for every multiple pixels serving a processing unit by screen processing and error diffusion processing.

Figure 8:
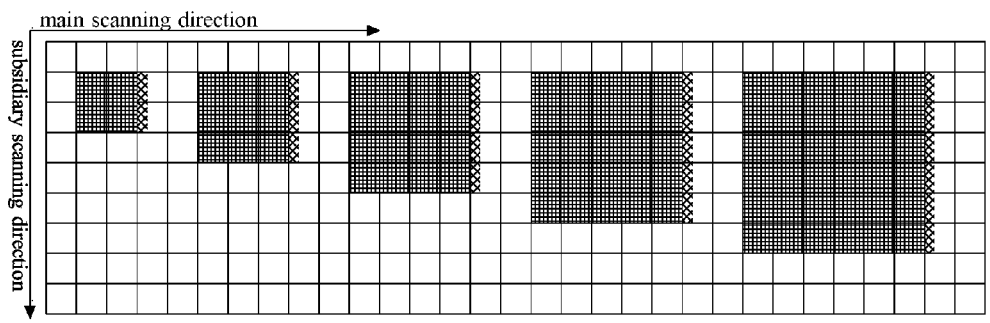
FIG. 8 is an explanatory drawing showing the situation of signal processing of an image forming apparatus.

FIG. 8 shows schematically a state of PWM signals. That is, a portion of a horizontal and vertical crosshatching pattern indicates that a PWM signal is in an ON state, and a portion of an oblique crosshatching pattern indicates a state that a PWM signal becomes an ON state for a period longer than an ideal value.

FIG. 8 shows the following cases in the order from the left. In the first case, an operation to form two pixels in an ON state in the main scanning direction is repeated two times in the subsidiary scanning direction, and when a pixel becomes from the ON state to the OFF state, the ON state is longer by 33% of one pixel than the ideal value. In the second case, an operation to form three pixels in an ON state in the main scanning direction is repeated three times in the subsidiary scanning direction, and when a pixel becomes from the ON state to the OFF state, the ON state is longer by 33% of one pixel than the ideal value. In the third case, an operation to form four pixels in an ON state in the main scanning direction is repeated four times in the subsidiary scanning direction, and when a pixel becomes from the ON state to the OFF state, the ON state is longer by 33% of one pixel than the ideal value. In the fourth case, an operation to form five pixels in an ON state in the main scanning direction is repeated five times in the subsidiary scanning direction, and when a pixel becomes from the ON state to the OFF state, the ON state is longer by 33% of one pixel than the ideal value. Further, in the fifth case, an operation to form six pixels in an ON state in the main scanning direction is repeated six times in the subsidiary scanning direction, and when a pixel becomes from the ON state to the OFF state, the ON state is longer by 33% of a pixel than the ideal value.

Figure 9:
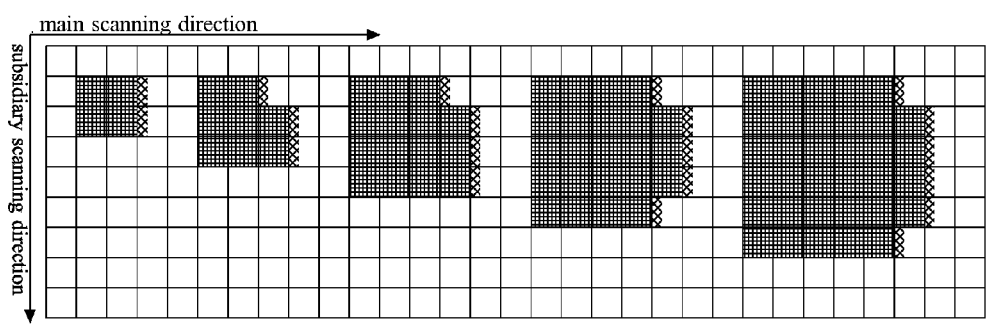
FIG. 9 is an explanatory drawing showing the situation of signal processing of an image forming apparatus.

FIG. 9 shows schematically a state of PWM signals after the correction, and a portion of a horizontal and vertical crosshatching pattern indicates that a PWM signal is in an ON state and a portion of an oblique hatching pattern indicates that a PWM signal is made an ON state for a period longer than the ideal value.

In this FIG. 9, since a PWM signal has a difference longer by 33%, the correction is performed so as to decrease a pixel in a ratio of one pixel per three pixels. In the order from the left, in the first case, since the number of pixel having a difference is two, the correction is not performed. In the second case, since the number of pixel having a difference is three, the correction is performed so as to delete one pixel. In the third case, since the number of pixel having a difference is four, the correction is performed so as to delete one pixel. In the fourth case, since the number of pixel having a difference is five (near to six), the correction is performed so as to delete two pixels. In the fifth case, since the number of pixel having a difference is six, the correction is performed so as to delete two pixels.

Here, in FIG. 9, since the pixels are deleted at portions near to the corner of the end portion of a group of multiple pixels, a shape change as an image is small. Accordingly, a sense of discomfort as an image is also small.

Figure 10:
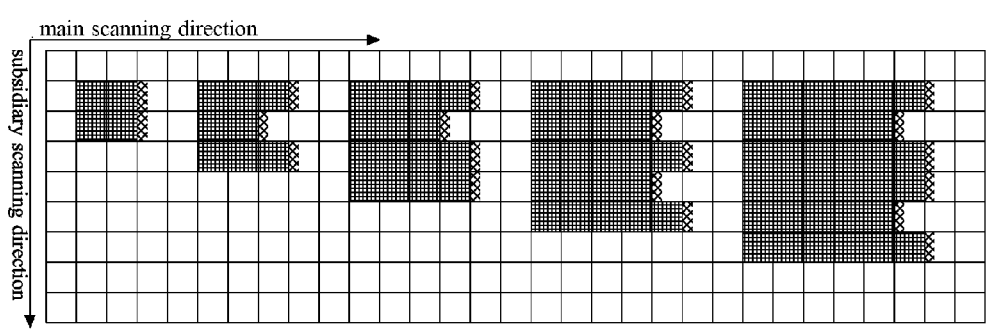
FIG. 10 is an explanatory drawing showing the situation of signal processing of an image forming apparatus.

Further, in FIG. 10, although the pixels are deleted similarly to FIG. 9, the pixels are deleted at portions other than the corner of the end portion of a group of multiple pixels. For this reason, a shape change as an image is large. Accordingly, a sense of discomfort as an image becomes relatively large. Therefore, the example in FIG. 10 is a undesirable example. However, although the examples in FIG. 9 and FIG. 10 are the general examples, they are not absolute examples applicable to all the cases.

For example, in this example, although pixels are deleted at the positions (target pixels) having a difference in pulse width, the pixels may be deleted at the other positions (periphery pixels) in the group of pixels. Further, it is preferable that pixels are deleted with reference to a preliminarily-prepared table.

For example, it is also preferable to prepare preliminarily tables of suitable patterns for each of photographic image and character. At this time, correction for the deletion is performed so as to make the pixels surrounding the deleted pixel not to protrude from a group of original pixels, that is, not to isolate, whereby it becomes possible to cancel a difference between the actual value and the ideal value of an image creating signal correctly and suitably.

Further, with the execution of the deletion of pixels at the previous stage of the screen processing and the error diffusion processing, it becomes possible to cancel a difference between the actual value and the ideal value of image creating signals correctly and suitably without disturbing the pattern of gradation expression in the image processing for every multiple pixels serving a processing unit by screen processing and error diffusion processing.

As described in the above, when image creating signals for image formation are produced in response to binary image data by using an image processing clock corresponding to each pixel of image data, a difference between the actual value and the ideal value of the signal width (pulse width) of the image creating signals is measured at the time of measurement, and the image data are corrected for each pixel being a correction unit so as to cancel the difference at the time of an actual action. In this way, a difference between the actual value and the ideal value of the image creating signal is corrected digitally at the stage of image data. For this reason, as compared with correction which adjusts the pulse width of PWM signals, it becomes possible to cancel correctly a difference between the actual value and the ideal value of an image creating signal.

Further, in the image forming apparatus equipped with such a signal processing apparatus 100, images are formed based on image creating signals produced in response to image data by the signal processing apparatus 100, whereby it becomes possible to cancel digitally correctly a difference between the actual value and the ideal value of an image creating signal and form images without being influenced by error.

With a technique to correct digitally a difference between the actual value and the ideal value of the image creating signal at the stage of image data, as compared with the comprehensive correction, such as gamma correction based on an image density patch, the image creating signals can be corrected individually correctly and appropriately. Further, the image creating signals are corrected digitally at the stage of image data without being corrected in the PWM processing section 120, whereby the image creating signals can be corrected surely.

[Second Constitution of the Signal Processing Apparatus and the Image Forming Apparatus]

Here, based on FIG. 11, the second constitution of the signal processing apparatus 100 usable for image formation will be described. The portions shown in FIG. 1 as the signal processing apparatus 100 are provided with the same respective reference numbers. Accordingly, the overlapped description for the portions is omitted.

Figure 11:
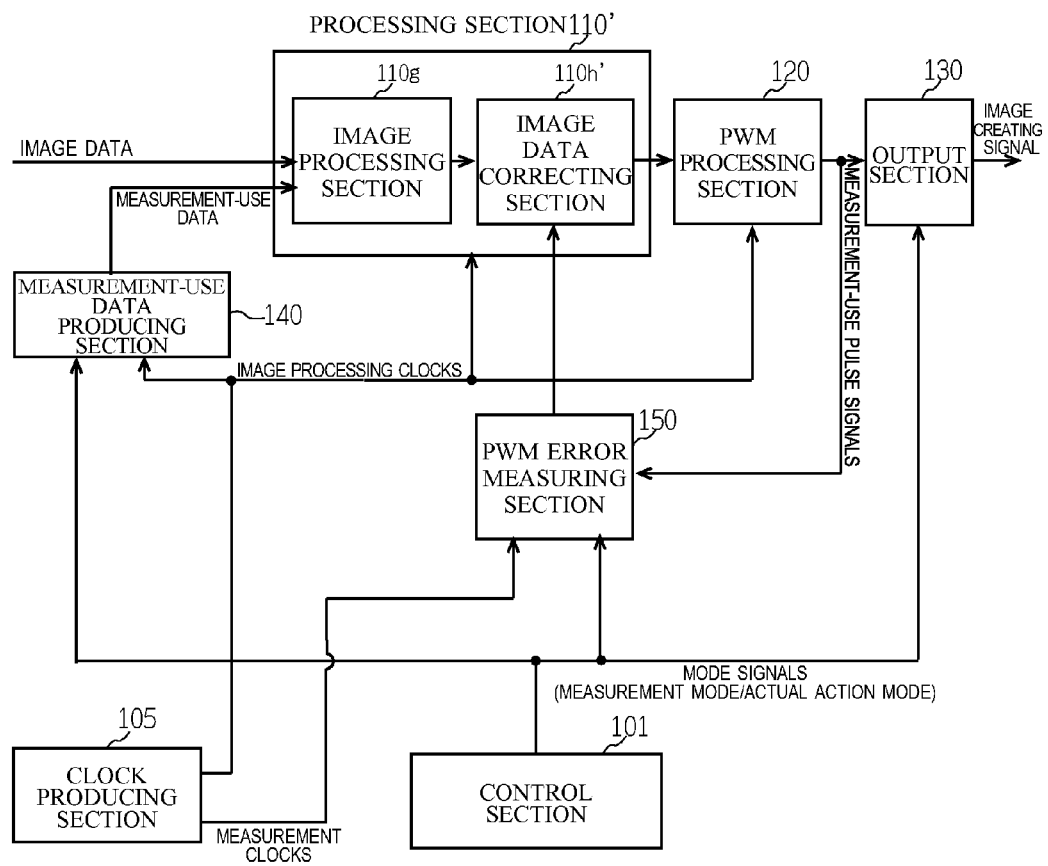
FIG. 11 is a constitutional diagram showing a constitution of a signal processing apparatus of an embodiment of the present invention.

The constitution in FIG. 11 is different from the constitution in FIG. 1 in the following points. that is, in the processing section 110', the image processing section 110g configured to perform image processing in terms of gradation expression for every multiple pixels serving a processing unit by screen processing and error diffusion processing is located at the forward stage, and the image data correcting section 110h' configured to correct image data is located at the backward stage.

Figure 12:
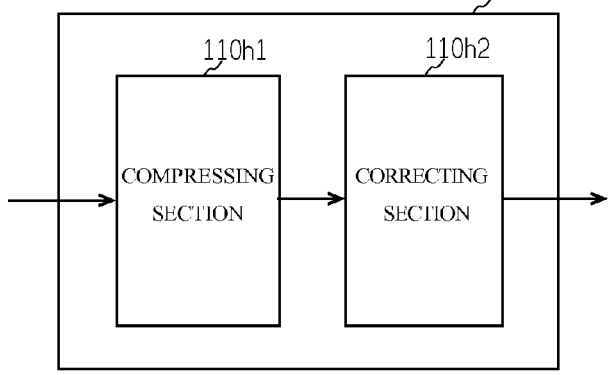
FIG. 12 is a constitutional diagram showing a constitution of a signal processing apparatus of an embodiment of the present invention.

Further, in this embodiment, the case where image data are 8 bits (0 to 255) is made into a specific example. As shown in FIG. 12, the image data correcting section 110h' is constituted so as to include a compressing section 110h1 configured to compress the value (0-255) of image data having been subjected to the screen processing and the error diffusion processing in the image processing section 110g into about 0.9 times of 0 to 230; and a correcting section 110h2 configured to correct the image data compressed in the compressing section so as to cancel a difference between the actual value and the ideal value based on the measurement result in the PWM error measuring section 150.

[Second Action of the Signal Processing Apparatus and the Image Forming Apparatus]

With reference to a flowchart of FIG. 13, the actions (2) of each of the signal processing apparatus 100 and the image forming apparatus equipped with this signal processing apparatus 100 will be described hereafter. The portions shown in the flowchart of FIG. 2 to describe the actions of each of the signal processing apparatus 100 and the image forming apparatus are provided with the same respective step numbers. Accordingly, the overlapped description for the portions is omitted.

Figure 13:
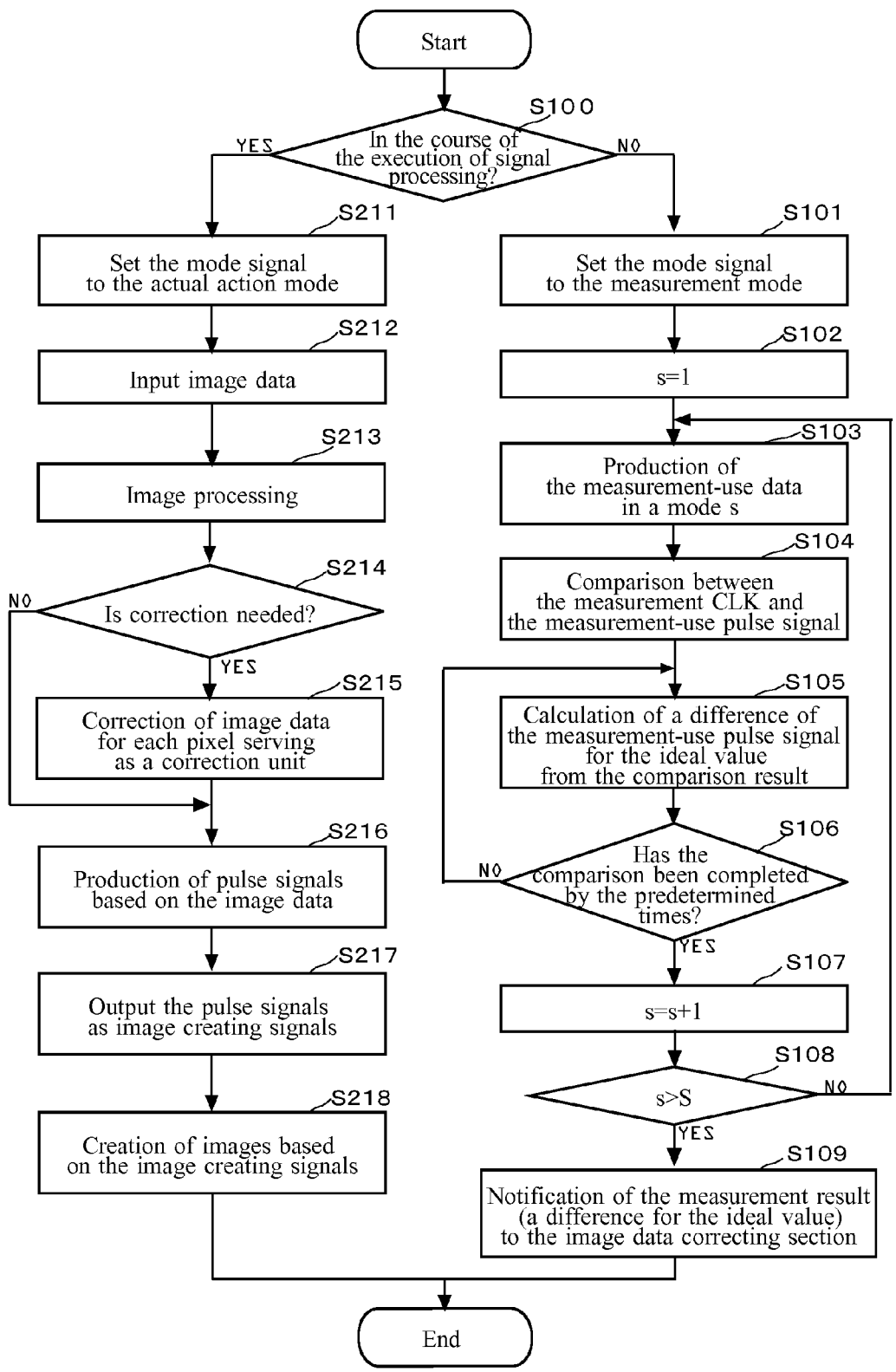
FIG. 13 is a flowchart for explaining actions in the embodiment of the present invention.

In the second actions, similarly to the first actions, measurement is performed in a measurement mode (Steps S100 to S109 in FIG. 13). Namely, the production of the measurement-use data by the measurement-use data producing section 140, the production of the measurement-use pulse signals by the PWM processing section 120 based on the measurement-use data, and the measurement of a difference between an actual value and an ideal value of a measurement-use pulse signal through a comparison between a measurement-use pulse signal and a measurement-use clock by the PWM error measuring section 150 are executed. Successively, the PWM error measuring section 150 notifies a measurement result to the image data correcting section 110h (Step S109 in FIG. 13).

The control section 101 checks whether the signal processing apparatus 100 is in the course of the execution of signal processing to create images for image formation (Step S100 in FIG. 13). When the signal processing apparatus 100 is in the course of the signal processing to create images for image formation ("Yes" at Step S100 in FIG. 13), the mode signal is set to an actual action mode (Step S211 in FIG. 13).

When image data are input (Step S212 in FIG. 13), image processing is performed for every multiple pixels being a processing unit in terms of gradation expression by screen processing and error diffusion processing in the image processing sections 110g (Step S213 in FIG. 13).

After the image processing in the image processing sections 110g, a measurement result (a difference between the actual value and the ideal value of a pulse signal) is notified from the PWM error measuring section 150, and when correction is needed ("YES" at Step S214 in FIG. 13), the image data correcting section 110h corrects the image data (Step S215 in FIG. 13).

Here, in the compressing section 110h1, the image data are compressed to about 90 percent, and then, in this state, the image data are corrected so as to cancel a difference between the actual value and the ideal value of a pulse signal. For example, if the pulse signal is shorter by 10% than the ideal value (a difference=−10%), the correction is performed in the way of 230×(1/(1+(−10/100))=255, thereby cancelling the difference. Further, if the pulse signal is longer by 10% than the ideal value (a difference=+10%), the correction is performed in the way of 230×(1/(1+(10/100))=209, thereby cancelling the difference.

Here, a compression ratio of 0.9 in the compressing section 110h1 is one example, and it may be determined in response to the situation of occurrence of a difference in the PWM processing section 120. In the above case, a difference in the PWM processing section 120 is supposed to be about 10%, and a compression ratio is set to 0.9 so as to cancel the difference.

Successively, upon receipt of the image data having been subjected to the image processing and the correction in the processing section 110, the PWM processing section 120 produces pulse signals by the PWM processing (Step S216 in FIG. 13). Further, in an actual action mode, the pulse signals from the PWM processing section 120 are supplied as image creating signals to the exposure section (not shown) of the image forming apparatus (Step S217 in FIG. 13). Based on the image creating signals, the image forming apparatus creates images such that toner images are formed on an image carrying member and the toner images are transferred to a recording paper sheet and fixed onto it (Step S218 in FIG. 13).

The above actions have been configured to measure a difference between the actual value and the ideal value of the pulse signal of the image creating signals at the time of measurement and to correct preliminarily-compressed image data so as to cancel the difference at the time of the actual action, thereby correcting digitally a difference between the actual value and the ideal value of the image creating signal at the stage of image data. Accordingly, it becomes possible to cancel accurately a difference between the actual value and the ideal value of the image creating signal.

Incidentally, the number of bits of the image data, the compression ratio, and the like should not be limited to the above specific examples, and may be determined arbitrarily.

[Other Actions]

Further, although the image forming apparatus capable of using the above signal processing apparatus 100 is supposed to be an image forming apparatus of an electro-photographing type, it should not be limited to this. That is, the signal processing apparatus 100 described in the above embodiment can be used for various types of image forming apparatuses.

[Effects Attained by the Actions of Each of the Signal Processing Apparatus and the Image Forming Apparatus]

As described in the above, the following effects can be attained by the signal processing apparatus and the image forming apparatus in the above embodiment.

(1) When image creating signals for image formation are produced in response to image data by using an image processing clock corresponding to each pixel of image data, a difference between the actual value and the ideal value of the signal width of the image creating signal is measured at the time of measurement, and the image data are corrected so as to cancel the difference at the time of an actual action. As a result, since a difference between the actual value and the ideal value of the image creating signals is corrected digitally at the stage of image data, it becomes possible to cancel correctly a difference between the actual value and the ideal value of the image creating signal.

(2) In the above (1), in order to cancel the difference of a target pixel measured at the time of the measurement, either the target pixel or a peripheral pixel around the target pixel is corrected. As a result, since a difference between the actual value and the ideal value of the image creating signal is corrected digitally at the stage of image data, it becomes possible to cancel correctly a difference between the actual value and the ideal value of the image creating signal.

(3) In the above (2), the correction is performed such that the pixel corrected so as to cancel the difference is not isolated from pixels before the correction, whereby it becomes possible to cancel correctly appropriately a difference between the actual value and the ideal value of the image creating signals.

(4) In above (1) to (3), for binary image data, an ON state is corrected to an OFF state, or an OFF state is corrected to an ON state with a ratio of one pixel for multiple pixels. As a result, since a difference between the actual value and the ideal value of the image creating signal is corrected digitally at the stage of image data, it becomes possible to cancel correctly a difference between the actual value and the ideal value of the image creating signal.

(5) In the above (4), in the case where the correction is performed in a ratio of one pixel for multiple pixels in response to the difference, when the number of pixels being in an ON state in a group of pixels is smaller than the number of the multiple pixels, the correction is not performed. As a result, since a difference between the actual value and the ideal value of the image creating signals can be corrected from the image data without causing a sense of discomfort, it becomes possible to cancel appropriately a difference between the actual value and the ideal value of the image creating signal.

(6) In the above (4), since the correction is performed by using a correction table preliminarily prepared in accordance with the intended use or kind of the image data, it becomes possible to cancel correctly appropriately a difference between the actual value and the ideal value of the image creating signals in a proper state in accordance with the intended uses, such as a character image and a photographic image.

(7) In the above (1) to (6), when image processing to express gradation with multiple pixels serving an expression unit is executed, the correction is performed so as to cancel the difference before the image processing. As a result, it becomes possible to cancel a difference between the actual value and the ideal value of image creating signal correctly suitably without disturbing the pattern of gradation expression in the image processing for every multiple pixels serving a processing unit by screen processing and error diffusion processing.

(8) In the above (1) to (7), measurement clocks asynchronous with the image processing clocks are prepared, the measurement clocks are compared with the signal width of the image creating signal corresponding to the predetermined image data for a prescribed time period, and the difference is measured from a ratio of conformity to non-conformity in the comparison, whereby it becomes possible to acquire correctly a difference between the actual value and the ideal value of image creating signals and to cancel it.

(9) In the above (8), when the frequency of the image processing clocks is f1, the frequency f2 of the measurement clocks is set to $0.5f1<f2<f1$, whereby it becomes possible to acquire correctly a difference between the actual value and the ideal value of image creating signal and to cancel it.

(10) An image forming apparatus equipped with the signal processing apparatus described in any one of the above (1) to (9) is configured to form images based on the image creating signal produced in response to image data by the signal processing apparatus, whereby it becomes possible to form images by cancelling correctly digitally a difference between the actual value and the ideal value of image creating signals.

The present U.S. patent application claims a priority under the Paris Convention of Japanese patent application No. 2012-262445 filed on Nov. 30, 2012, which shall be a basis of correction of an incorrect translation.

What is claimed is:

1. A signal processing apparatus configured to produce image creating signals for image formation in response to image data by using an image processing clock corresponding to each pixel of the image data, comprising:
   a measuring section configured to measure a difference between an actual value and an ideal value of a signal width of an image creating signal at a time of measurement; and
   a processing section configured to correct the image data so as to cancel the difference measured by the measuring section at a time of an actual action;
   wherein when the image data are binary image data including an ON state and an OFF state, the processing section corrects an ON state to an OFF state, or an OFF state to an ON state at a ratio of one pixel for multiple pixels of the image data, in accordance with the measured difference.

2. The signal processing apparatus described in claim 1, wherein the processing section corrects either a target pixel or a peripheral pixel around the target pixel at the time of the actual action, so as to cancel the difference of the target pixel measured at the time of the measurement.

3. The signal processing apparatus described in claim 2, wherein the processing section performs correction such that a pixel corrected so as to cancel the difference does is not isolated from pixels before the correction.

4. The signal processing apparatus described in claim 1, wherein when the processing section performs correction at a ratio of one pixel for multiple pixels of the image data in accordance with the measured difference, if a number of pixels being in an ON state in a group of pixels is smaller a number of the multiple pixels, the processing section does not perform correction.

5. The signal processing apparatus described in claim 1, wherein the processing section performs correction by using a predetermined correction table in accordance with an intended use or kind of the image data.

6. The signal processing apparatus described in claim 1, wherein when the processing section performs image processing so as to express gradation with multiple pixels serving as an expression unit, the processing section performs correction so as to cancel the difference before the image processing.

7. A signal processing apparatus configured to produce image creating signals for image formation in response to image data by using an image processing clock corresponding to each pixel of the image data, comprising:
  a measuring section configured to measure a difference between an actual value and an ideal value of a signal width of an image creating signal at a time of measurement; and
  a processing section configured to correct the image data so as to cancel the difference measured by the measuring section at a time of an actual action,
  wherein the measuring section prepares measurement clocks asynchronous with the image processing clocks, compares the measurement clocks with the signal width of the image creating signal corresponding to the image data for a prescribed time period, and measures the difference from a ratio of conformity to non-conformity in the comparison.

8. The signal processing apparatus described in claim 7, wherein when a frequency of the image processing clocks is f1, a frequency f2 of the measurement clocks is set to $0.5f1 < f2 < f1$.

9. An image forming apparatus, comprising:
  a signal processing apparatus configured to produce image creating signals for image formation in response to image data by using an image processing clock pulse corresponding to each pixel of the image data; and
  an image forming section configured to form images based on the image creating signals produced by the signal processing apparatus,
  wherein the signal processing apparatus includes:
    a measuring section configured to measure a difference between an actual value and an ideal value of a signal width of an image creating signal at a time of measurement; and
    a processing section configured to correct the image data so as to cancel the difference measured by the measuring section at a time of an actual action,
  wherein when the image data are binary image data including an ON state and an OFF state, the processing section corrects an ON state to an OFF state, or an OFF state to an ON state at a ratio of one pixel for multiple pixels of the image data, in accordance with the measured difference.

10. The image forming apparatus described in claim 9, wherein the processing section corrects either a target pixel or a peripheral pixel around the target pixel at the time of the actual action, so as to cancel the difference of the target pixel measured at the time of the measurement.

11. The image forming apparatus described in claim 10, wherein the processing section performs correction such that a pixel corrected so as to cancel the difference is not isolated from pixels before the correction.

12. The image forming apparatus described in claim 9, wherein when the processing section performs correction at a ratio of one pixel for multiple pixels of the image data in accordance with the measured difference, if a number of pixels being in an ON state in a group of pixels is smaller than a number of the multiple pixels, the processing section does not perform correction.

13. The image forming apparatus described in claim 9, wherein the processing section performs correction by using a predetermined correction table in accordance with an intended use or kind of the image data.

14. The image forming apparatus described in claim 9, wherein when the processing section performs image processing so as to express gradation with multiple pixels serving as an expression unit, the processing section performs correction so as to cancel the difference before the image processing.

15. An image forming apparatus comprising:
  a signal processing apparatus configured to produce image creating signals for image formation in response to image data by using an image processing clock pulse corresponding to each pixel of the image data; and
  an image forming section configured to form images based on the image creating signals produced by the signal processing apparatus,
  wherein the signal processing apparatus includes:
    a measuring section configured to measure a difference between an actual value and an ideal value of a signal width of an image creating signal at a time of measurement; and
    a processing section configured to correct the image data so as to cancel the difference measured by the measuring section at a time of an actual action,
  wherein the measuring section prepares measurement clocks asynchronous with the image processing clocks, compares the measurement clocks with the signal width of the image creating signal corresponding to the image data for a prescribed time period, and measures the difference from a ratio of conformity to non-conformity in the comparison.

16. The image forming apparatus described in claim 15, wherein when a frequency of the image processing clocks is f1, a frequency f2 of the measurement clocks is set to $0.5f1 < f2 < f1$.

* * * * *